(12) United States Patent
Eibach et al.

(10) Patent No.: US 6,654,910 B1
(45) Date of Patent: Nov. 25, 2003

(54) INTELLIGENT FAULT MANAGEMENT

(75) Inventors: Wolfgang Eibach, Holzgerlingen (DE); Dieter E. Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 09/611,475

(22) Filed: Jul. 7, 2000

(30) Foreign Application Priority Data

Aug. 14, 1999 (EP) .............................. 99116009

(51) Int. Cl.$^7$ ................................................ G06F 11/00
(52) U.S. Cl. ............................................ 714/37; 701/29
(58) Field of Search ........................... 714/37, 25, 43, 714/44, 39, 47; 701/29

(56) References Cited

U.S. PATENT DOCUMENTS

| | | |
|---|---|---|
| 5,594,646 A | 1/1997 | Itoh et al. |
| 6,321,148 B1 * | 11/2001 | Leung ........................ 701/29 |
| 6,330,499 B1 * | 12/2001 | Chou et al. ................. 701/33 |

FOREIGN PATENT DOCUMENTS

| | | | |
|---|---|---|---|
| EP | 0 551 631 | 7/1993 | |
| EP | 0 905 594 | 3/1999 | |
| WO | WO 91/02257 | * 2/1991 | ........... G01R/31/00 |
| WO | WO 98/26958 | 6/1998 | |

OTHER PUBLICATIONS

*Dynamically Reconfigurable Fault–Tolerant Computer Architecture for Control Systems*, Research Disclosure, GB, Industrial Opportunities Ltd. Havant, No. 324, Apr. 1, 1991, pp. 269–271, XP000170393.

* cited by examiner

*Primary Examiner*—Scott Baderman
(74) *Attorney, Agent, or Firm*—Akerman Senterfitt

(57) ABSTRACT

A principle for handling system failure situations thereby maintaining minimum fault recovery time and providing high system availability is described, especially for controlling the system behavior in fault situations of Electronic Control Units used in automotive vehicles. This principle is providing unique solutions for fault analysis, fault recovery definition and system re-vitalization. It is a key attribute of the principle keeping the demand for hardware and software overhead at a minimum. The method applies graceful degradation of system functionality, allowing to achieve the implementation of cost effective systems.

23 Claims, 4 Drawing Sheets

INTELLIGENT FAULT MANAGEMENT

FIELD OF THE INVENTION

The present invention relates in general to an electronic control system for controlling the function of a processing system. In particular the invention relates to a method allowing to manage system fault situations of an electronic control system. Still more specifically, the invention deals with such a control system that can be used in an automotive vehicle.

BACKGROUND OF THE INVENTION

In recent years the complexity of electronic control systems used in consumer products and specifically the automobile electronics has increased dramatically. Although manufacturers of electronic subassemblies try to ensure that their products are reliable, it is almost impossible to ensure not to have any faults somewhere in a system at any given time within the products lifecycle. As a result, reliability and fault tolerant behavior of complex systems has become a topic of major concern to designers, manufacturers and users.

DESCRIPTION OF BACKGROUND ART

There are two fundamentally different approaches that are presently used to increase the reliability of computing systems.

The first approach is called fault prevention, also known as fault intolerance. The second approach is represented by real fault tolerance.

In the traditional fault prevention approach the objective is to increase the reliability of each used part within the overall system. Since it is almost impossible to achieve an absolute reliable system in practice, the goal of fault prevention is to reduce the probability of system failure to an acceptably low value. The reliability of a system can be increased by employing the method of worst case design and by using high-quality components. Since system interconnection devices represent a very common crystallization point for various failures, refined interconnections and imposing strict quality control procedures during the assembly phase are further important reliability improving measures.

However, most likely this type of solutions and measures will increase the cost of a system significantly.

As to the fault tolerance approach, two major techniques are typically used:

(a) Incorporate redundancy (i.e. usage of additional, multiple identical resources) into a system with the aim of masking the effects of faults, and (b) Use error corrections (most common realized and utilized by bus systems and by storage devices).

In this type of systems, faults are expected to occur during computation. In case of an detected, identified failure, the system will (i) be reconfigured by enabling the respective redundant elements, and/or (ii) the error correction circuitry generating, controlling and monitoring the error corrections codes will automatically correct the differing data.

The realization of such type of fault tolerant system will require to provide and manage multiple instances of the redundant (identical) hardware elements and/or error correction circuits. As a drawback, this type of system implementation is encountering a multiplicity of cost—and going along physical size and power consumption.

FIG. 1 is illustrating a typical system using state of the art techniques. The examplary system is using a redundant instantiation for the NVRAM/VRAM (Non-Volatile and Volatile Random Access Memory) for the storage subsystem. The I/O devices are laid out redundantly for the I/O device controller and for the adjacent physical I/O device. A multiplexer element is switching to the redundant data path in case of occurring failure in this system area. A 'system test and fault recovery controller unit'0 is implemented to monitor the system functionality and to manage and to control the fault recovery steps to be performed. Additionally, a typical system supervising feature is provided by the Parity Checker. In this example, this feature is additionally providing Error Correction covering data integrity failures detected on the system bus.

Most commonly the system CPU is performing failure detecting and diagnostic routines as well. The application code for the additional diagnostic software routines is typically stored in the basic storage sub-system—and of course, redundantly contained in the redundant storage devices as well.

The system CPU, as explained exercising failure detecting routines, supporting and assisting the 'system test and fault recovery controller', can in addition be used to test and verify the integrity of all implemented failure detection and fault management devices and sub-systems.

This type of fault-tolerant system implementation is typically restoring the originally system functionality for all occurring 'recoverable' fault situations. Failures detected or not detected by the fault-management system will lead to a—potentially hidden—system malfunction, or to a general system abort.

Typically this type of fault-tolerant system realization is used in expensive and safety relevant commercial systems, justifying the extensive cost for implementation. Cost sensitive embedded systems for this reason only use partial and drastically reduced implementations, with the drawback of providing only limited fault recovery capability and emergency running attributes.

Nevertheless, the effectiveness of fault tolerance for enhancing the reliability of processing systems is much more pronounced in a system composed of basically reliable components than in a system of unreliable components. In other words, while fault tolerance can be used to increase the reliability of an already reliable system significantly, it is of little use—and can even have a detrimental effect—if the original system is unreliable in the first place.

Co-pending European Patent Application 99 101 817.7, assigned to the same assignee as the present application, dicloses an electronic control system for controlling the function of a processing system, especially for the use in an automotive vehicle, wherein said control system comprises a plurality of logical control elements, each of which is especially adapted to perform special tasks, whereby each of said control elements is able to communicate with every other control element.

SUMMARY OF THE INVENTION

It is therefore an object of the present invention to provide a method that to manage system fault situations with high system reliability and availability for Electronic Control Systems (ECUs) while maintaining low system cost.

It is a further objective to keep the hardware and software overhead at a minimum, thus limiting negative influence to the power dissipation as well as the physical measures size and weight.

It is still a further object to provide a system that is able to overcome the above mentioned shortcomings of the prior art.

The present invention describes a principle (hereinafter called "Intelligent Fault Management" (IFM) principle) allowing to manage system malfunctions and to restore system vitality of complex electronic control systems, featuring multiple cooperating processing elements—to an achievable extend and for a justifiable effort.

As mentioned above, IFM stands for a principle handling system failure situations maintaining minimum fault recovery time and providing high system availability. This principle is providing unique solutions for fault analysis, fault recovery definition and system re-vitalization. A method applying graceful degradation of system functionality is proposed, to allow to achieve the implementation of cost effective systems.

In differentiation to typical, i.e., state of the art fault management systems, the proposed idea is providing calculated deterministic fall back strategies, allowing to manage and to control the fault/vital system behavior. The method used by the IFM principle is supporting prioritized staggered fall-back solutions, degrading the system functionality in pre-assigned levels for system functionality.

The application of the IFM principle is focusing on the requirements most commonly encountered by embedded commercial systems and demanding advanced consumer electronics.

In particular the IFM principle is advantageous to be used in electronic control systems applied in highly cost sensitive fields as for example: devices used in modern automotive vehicles, pervasive computing devices, as well as in consumer electronics, requiring fault tolerant behavior.

Rather than providing extensive redundant hardware, the principle is utilizing the existing sub-systems or components of the electronic control system (as, e.g., shown in FIG. 2) in multiple 'reuse' instances. In other words, existing sub-systems will be reused, performing entirely different 'alien', i.e., completely different, functionality as opposed to the original definition—an important key, allowing to achieve the objectives for the IFM principle. It has to be mentioned that each sub-system can, in turn, consist of several further sub-systems.

In a top down approach, i.e., level for level of the pre-assigned levels (cf. FIG. 3), the system will 'give up' less important applications—trying to provide most critical and basic system relevant functionality.

The IFM principle is combining a balance of hardware and software elements enabling to develop and build highly reliable embedded processing systems.

The IFM method allows to keep the usage of redundant elements and fault preventive elements at a minimum of implementation. The measures, combined used by IFM, are leading to a significantly reduced overhead on electronic components. The IFM support elements and mechanisms can be implemented by using algorithms realized by software to a wide extend. The increase of the system storage size and the volume of hardware components are kept at a justifiable grade, thus leading to a significant cost advantage.

Precondition supporting profitable applicability of the IFM principle is a system architecture using loosely coupled sub-systems and processors.

In case of full system functionality has to be ensured at any time and for any type of occurring fault, the advantageous applicability for the proposed IFM method is reduced to 'sub-sets' of the IFM processes. The implementation for this type of fault behavior has to be verified and to be judged in accordance to the fault behavior specifications of the overall system in focus very thoroughly.

BRIEF DESCRIPTION OF THE DRAWINGS

| FIG. 1 | shows a Fault Management System according to the state of the art, |
|---|---|
| FIG. 2 | schematically depicts an examplary ECU in accordance with the invention, |
| FIG. 3 | shows an example of a graceful degradation of system functionality according to the present invention, depicting n pre-assigned sub-vital levels of system functionality, |
| FIG. 4 | is an example for a 4-control-element ECU according to the invention, showing the concurrent VMC processes, |
| FIG. 5 | schematically illustrates the VMC process states according to the invention, |
| FIG. 6 | is an example of an arbiter, generating a re-vitalization command according to the invention; and |
| FIG. 7 | schematically depicts the principle of the invention, extended to overall system support. |

DETAILED DESCRIPTION OF THE PREFERRED EMBODIMENT

Figure 1:
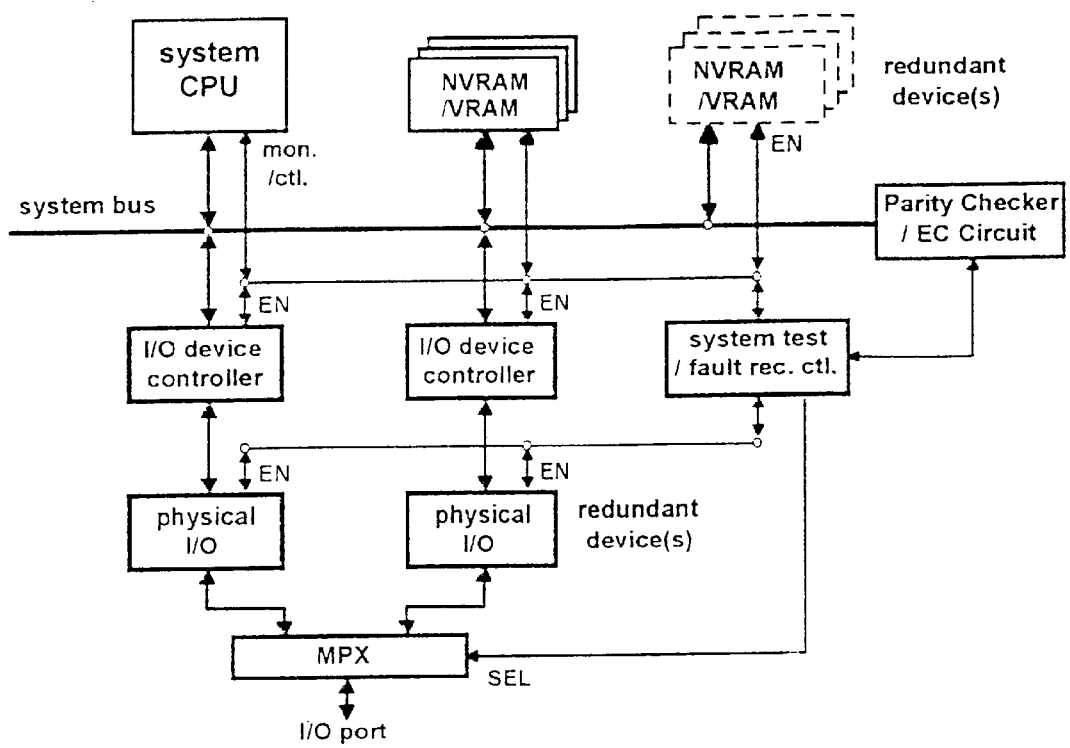
Figure 2:
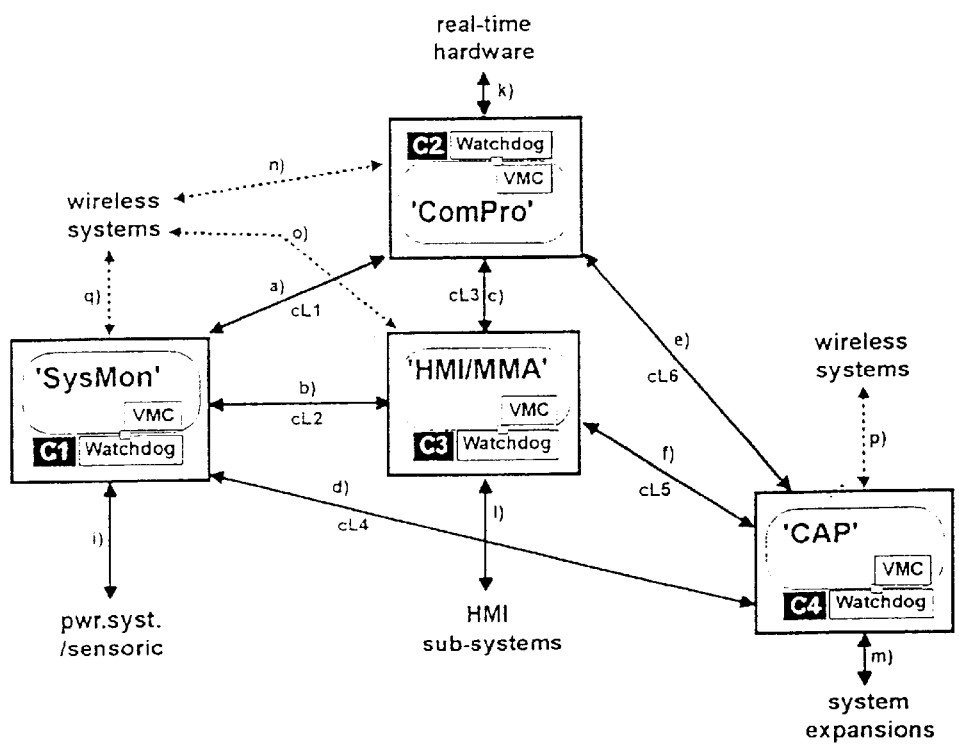

As mentioned above, the general precondition supporting the applicability of the proposed IFM principle is a distributed processing system architecture. Especially advantageous is a so-called loosely coupled system. This type of system is typically represented by an overall system, featuring multiple cooperating Control Elements (CEs) or processing units. To be enabled for IFM, the topology has to provide a minimum of two CEs, however, there is no logical upper limit for the number of involved CEs. For ease of explanation, an example Electronic Control Unit (ECU), realizing the IFM principle predestinated for advantageous use in automobiles, will be used. The ECU system, shown in FIG. 2, is featuring a distributed processing architecture, based on four individual, corresponding processing elements (CEs C1 to C4)—all together providing the overall ECU specific functionality.

The system design, in conformance to the IFM principle, has to provide the IFM specific elements and has to follow and to establish the following design points and characteristics:

Each CE is featuring an intercommunication scheme supporting to communicate independently and individually to each other CE of the system (cf. FIG. 2, interconnections a) to f) representing the communication links cL1 to cL6).

Each CE (i.e., C1 to C4 in FIG. 2) is furnished with a built-in timing funcionality (e.g., a timer, a watchdog or the like), exclusively provided for carrying out fault management. It has to be mentioned that it is possible to use a kind of counter already present in the CE, however, providing a timing functionality especially adapted to each CE according to its special function is much more advantageous.

All timers are designed to support a programmable timing range, identical on the achievable space of time for all Ces, i.e., a timer associated with a special CE can also take over the task assigned to another timer associated with a different CE.

Each Control Element is equipped with a Vitality Management Control (VMC) function. In case that the CE is represented by a processor unit itself, the VMC can be implemented by a software routine, exercised by this processor. In all other cases, a VMC hardware solution has to be designed. The VMC may consist of a state machine, a processor, a programmable sequencer, etc.

The preconditioned distributed system topology for the IFM conform ECU is most commonly following a loosely coupled processing architecture. Typically this type of system is supporting and allowing asynchronous operation of each CE involved. Given this basic architecture, each VMC and watchdog timer is unrestricted 'free-running' and for this reason is in asynchronous relation to the corresponding VMCs and CEs.

The ECU example shown in FIG. 2 will be used consistently for the further discussion of the IFM theory. A description of the internal CEs C1 to C4 of the example is given in the co-pending European patent application 99 101 817.7.

It has to be noted that supporting specific ECU applications, the CEs can optionally provide connectivity to wireless communication devices. Single devices or multiple wireless communication devices connected to individual CEs can be involved.

In the following, some basics and a brief summary describing the most typical fault types and fault behaviors will be outlined.

The most widely accepted definition of a fault tolerant computing system is that 'it is a system which has the built-in capability (without external assistance) to preserve the continued correct execution of its programs and input/output functions in the presence of a certain set of operational faults'. An 'operational fault' is an unspecified deviation of the correct value of a logic variable in the system hardware or a design fault in the software. 'Correct execution' means that the programs, the data and the results do not contain errors and that the execution time does not exceed a specified limit.

A failure is said to have occurred if a circuit or system deviates from its specified behavior. A fault on the other hand is a physical defect which may or may not cause a failure. A fault is characterized by its nature, value, extend and duration. The nature of a fault can be classified as logical and non-logical. A logical fault causes the logic value at a point in a circuit to become opposite to the specified value. Non-logical faults include the rest of the faults such as the malfunction of, e.g., the clock signal, power failure, etc. The extent of a fault specifies whether the effect of the fault is localized or distributed. A local fault affects only a single variable whereas a distributed fault affects more than one variable. A logical fault, e.g., is a local fault whereas a malfunction of the clock is a distributed fault. The duration of a fault refers to whether the fault is permanent or temporary.

In the literature, temporary faults have often been referred, to as 'intermittent' or 'transient' faults. It is only recently that a distinction between the two types of faults has been made. Transient faults are non-recurring temporary faults. They are usually caused by a particle radiation or power supply fluctuation, and they are not repairable because there is no physical damage to the hardware. Intermittent faults are recurring faults that reappear on a regular basis. Such faults can for example occur due to loose connections, partially defective components or poor design. Intermittent faults, occurring due to deteriorating or aging components, may eventually become permanent. Some intermittent faults also occur due to environmental conditions such as temperature, humidity, vibration, etc.

The typical prevention of this type of faults is protecting the system from physical environment using shielding, filtering, cooling, etc.

An Intermittent fault in a circuit causes a malfunction of the circuit only if the circuit is active; if it is inactive the circuit will operate correctly.

The extend of prevention has to be defined initially with respect to the system cost, comprising a balance between standard prevention and redundant techniques in coincidence with tolerable 'graceful functional degradation' using the IFM principles according to the invention.

The IFM principle is providing unique solutions for fault analysis, fault recovery definition and system re-vitalization. In case that full system functionality cannot be restored, a method applying graceful degradation of system functionality is proposed.

Figure 3:
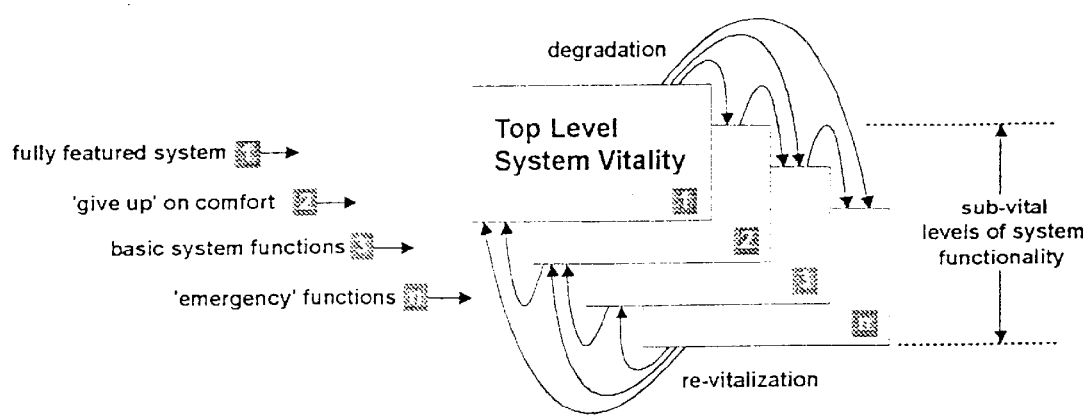

One example of such graceful degradation is given in FIG. 3. In case a failure happens to the fully featured system 1, it is first checked whether the system can be readily re-vitalized by correcting the error. In case this is not possible, the system will "give up" some comfort, 2. This means that features not representing important, i.e., essential functionality for the actual vehicle operation, e.g., the diagnostic network, will be disregarded or "shut off". In case of more severe system malfunction, it may be inevitable to reorganize the system, degrading to the lowest level of system vitality. Not representing a favorable situation, this 'worst case' degradation of system vitality most potentially will not allow to operate the vehicle in a familiar manner, however, not to underestimate the basic capabilities, still providing essential functions, like support to unlock the vehicle, to close the doors, windows or sunroof, to setup an emergency call, and other 'elementary' things.

After completing the calculations analyzing the fault situation, the results are used to reorganize and to consequently re-vitalize the system, as will be explained below in more detail.

Representing an important key idea, the IFM principle is using 'cooperative distributed intelligence' for detecting faults and for defining the fault recovery strategy. Each ECU system sub-system is performing the IFM algorithms in a specific manner, enabled to provide judgement of the overall system vitality, not using redundancy. The judgement for the fault-backup strategy is determined in agreement with all shared identified vital sub-elements of the majority in a cooperative manner. Nevertheless, even a single remaining vital sub-element is able to decide—within a certain 'diffuseness', comparable to holographic techniques—providing a system fall-back and recovery strategy appropriate to the specific situation.

The further key idea for IFM, as opposed to redundant systems solutions, is to reuse existing system resources and/or entire sub-systems, 'reorganized' to perform entirely different 'alien' functionality, i.e., taking over responsibility that normally is related to other CEs by redefining the respective sub-systems. An important IFM principle implementation, supporting this specific objective, is represented by the IFM unique 'alien' reuse of the most significant storage sub-system(s) and the corresponding processor systems:

The IFM specific method for 'reverse boot' and the 'top down boot', applied in specific fault situations, is representing a key realization for the IFM principle.

The reverse boot principle is enabling to reuse entire controller-sub-system and storage sub-systems to perform entirely different applications as opposed to the system organization of origin.

For ease of understanding, conform to the examples used throughout this application, the automotive ECU, utilizing four individual CEs is used to explain the principle (cf. FIG. 2).

In focus for the 'reverse boot' implementation are the CEs 'ComPro' and 'HMI/MMA'. Both sub-systems are represented by an individual processor system and a corresponding storage sub-system. The ComPro is performing all real-time related applications of the ECU. The operating system, e.g., is OSEK, a real-time standard commonly used in automotive ECUs. The performance of this CPU is typically <30 MIPS, and the demand on storage capacity is typically <256 Kbytes.

The HMI/MMA sub-system is performing complex Human-Machine-Interface and Multi-Media applications requiring a processing performance of more than 300 MIPS. The preferred operating system is typically represented by a RTOS providing a JVM (Java Virtual Machine). The storage capacity is typically >16 Mbytes.

In comparing the storage demand of both sub-systems, the ComPro requirement is representing a 'fraction' of the typical requirements indicated by the HMI/MMA. The first step, leading to the 'reverse boot' idea, is to initially load the ComPro code (operating system and application) in addition to the HMI/MMA code into the HMI/MMA storage subsystem. Important is to locate the additional ComPro-code beginning at the very top of the storage system. This can be achieved by applying the address complement, thus addressing the storage in a top-down manner.

In standard application, the system is operated by the addresses generated by the HMI/MMA processor. The operating system and the applications are located in the address-room beginning at the bottom address. Mechanisms provided by the operating system have to ensure, not to utilize the address room holding the ComPro code at the top area of the storage system.

The realization for the IFM principle is reflected by distinctive procedures, established and provided by specific hardware elements and combined software algorithms. The entire principle is embedded in three major IFM-process procedures, these procedures being executed by a Vitality Management Control (VMC) function, i.e., control means for continuously monitoring the system and performing tests and diagnostics to detect system faults. According to the IFM key ground-rule to apply a 'cooperative distributed intelligence', the VMC function is implemented on each outlined CE specifically and individually. In carrying out the example shown in FIG. 2, the IFM solution for this system is performed by four individual VMC systems.

Figure 4:
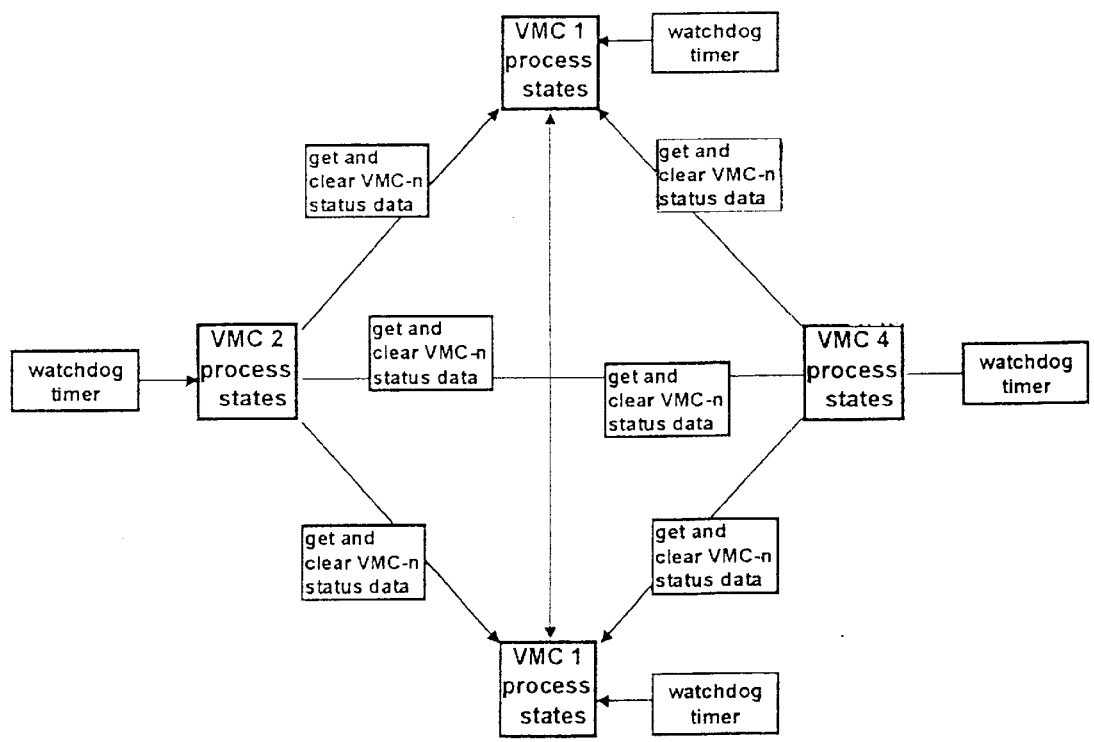

Referring to FIG. 4, there is illustrated an overall IFM implementation employing four individual VMC functions. The VMCs are interconnected by a bussing scheme, allowing for each VMC to correspond with all other VMCs via individual, independent communication paths. Each VMC is further equipped with an individual timing function, e.g., a watchdog.

The overall IFM process is represented by the simultaneously operating multiple VMCs, where each VMC is performing its individual VMC master program, custom tailored to the respective CE.

Although specific to the CEs, the individual VMC master programs are following identical basic rules. In general, two main modules are assembling the VMC master program(s):

(a) The 'individual' program module is covering the respective CE specific test and diagnostic,
(b) The 'common' VMC program module, using identical algorithms operating on all VMCs—is analyzing the vitality information obtained by the respective other CEs.

Due to the nature of the ECU system architecture, namely featuring loosely coupled multiprocessing that the VMC programs are operating in an asynchronous timing relation, i.e., are free-running and will report in equal time intervals. Nevertheless, although executing not in exact timing relation, it is an important fact to mention, the VMC programs are exercised concurrently on each respective CE, and as a second important design point, the VMCs are defined to complete in a predefined timing frame. The timing frame is given by the respective timing function provided for each VMC individually.

The overall IFM-process is operating in the 'background', invisible to the general ECU application(s), thereby distinguishing two main process phases:

Phase 1: The specific VMC master programs are continuously exercising test and diagnostic routines. This routine, hereinafter called the 'System Vitality Monitor' (SVM) is exercised during the VMC V-state, representing the Vital state, i.e., the state where the system is working in, normal operation'.

Phase 2: The cooperative phase - invoked each time the timing function elapses, or in case of any irregularity or failure has been detected. This routine is exercised during the VMC U-state, representing an Uncertain state, and, depending on the situation, will invoke a system transit to the X-state, representing the VCM eXecution state, where process routines are carried out that identify the failing element, calculate a fall-back strategy (degradation) and prepare recovery for sub-vital level reconfiguration (cf. FIG. 3).

Figure 5:
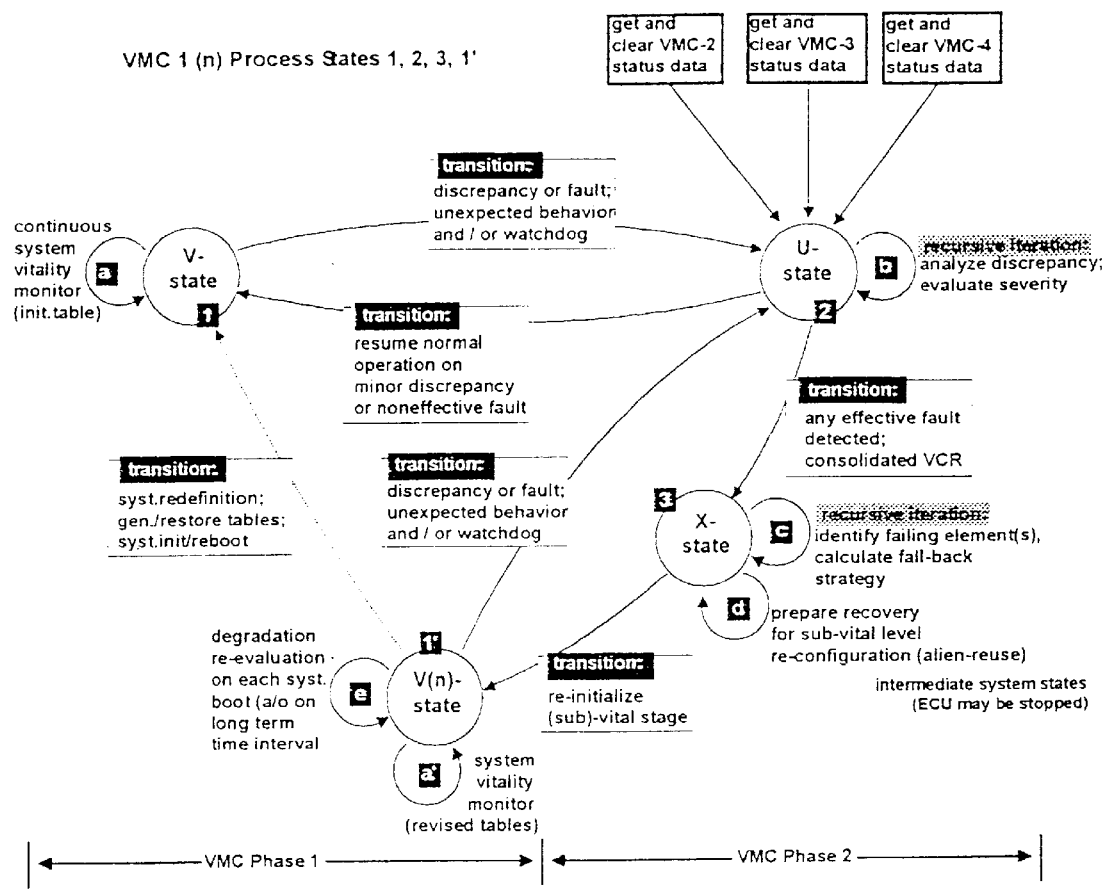

Both phases are incorporated in each of the individual VMC master programs—where all VMCs together are representing the IFM algorithm. FIG. 5 is illustrating the VMC process states and the corresponding process routines.

In 'normal operation', defined as V-state, the VMC is exercising the SVM procedure (a). All values gathered are compared to predefined "behavior data" stored in look-up tables.

Periodically invoked in pre-defined time intervals, generated, e.g., by the timing function, or initiated in case any deviation from 'normal' behaviour is detected, the VMC will exercise the cooperating IFM phase. In this first transition, the system changes from V-state to the U-state.

Process routine (b), exercised during U-state, is analyzing the differing system situation. In case no severe problem is detected by this routine, the IFM system will resume its normal operation, transiting back to V-state. A severe problem exists when it is clear that a special function of the system cannot be carried out any longer. For example, a severe problem is present if the windshield wiper doesn't work any more. However, in case only the intermittent circuit of the windshield wiper is not working, this would be looked at as a non-severe problem. It is up to the designer to define the difference between a severe and a non-severe problem.

In case an effective fault situation (not necessarily a severe problem, but a situation requiring some special measure to be taken) is identified during the U-state process execution, the VMC process will cause a state-transit, migrating to the VMC process X-state.

The process routines (c) and (d) are performed throughout the X-state. The simultaneously operating VMC process routines, exercised timing conform on each of the ECU control elements, will cooperatively investigate the entire system situation and, in consequence, will calculate a fault backup strategy, i.e., it will be decided what sub-vital level of functionality should be addressed. This means that for each system fault there exists a fall-back position stored in a special table that can be looked up by the respective VMC.

Representing a key idea of the IFM principle, a consensus will be built by a very unique cooperation of all VMC systems. In differentiation to common cooperating systems, the VMCs are exchanging status information and calculated signatures, i.e., bit values, representing the status of each individual CE and the status of the other CEs, providing pre-results for the system re-vitalization strategy, nevertheless, the decision on the strategy to be taken in the end, is made in a non-democratic manner by each VMC individually. Regardless of the results indicated by the respective 'partner VMCs', each VMC will decide on its own calculated final result, uncompromisingly issue a re-configuration command and in consequence will trigger the system re-initialization.

In other words, at the same moment of time, completing the calculations, each VMC will initiate an execution command, e.g., a recommendation such as "Shut off function 'xy'" for system reconfiguration and re-initialization—in closed timing coincidence, each VMC with respect to its individually calculated result.

Process (c) is applying an iterative calculation process, executed to finally result in a fault recovery strategy. The number of iterations may depend on the complexity of the system—the more complex the system (i.e., the more CEs present), the more iterations will be carried out.

On the first look, chaos seems to be potential—however a specific solution will finally ensure to carry out the correct decision.

Figure 6:
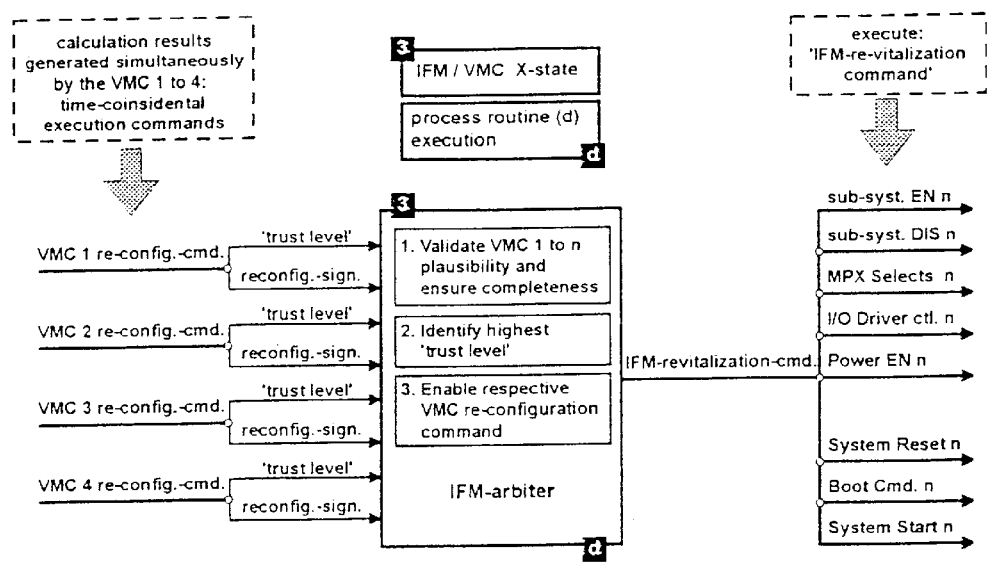

As shown in FIG. 6, the individual process-calculations of the VMCs are resulting in the reconfiguration commands, each presenting a twofold information. One part of the information is providing the system reconfiguration signature, and the second part is providing a digital value, indicating a judgement on 'trust-level', e.g., depending on the number of iterations performed, of the calculated reconfiguration result.

The VMC reconfiguration commands, as illustrated in FIG. 6, are issued to a IFM specific hardware sub-system, hereinafter called the 'IFM-arbiter'. The IFM-arbiter is designated to exercise the X-state routine (d) (cf. FIG. 5)—performing the decision on the 'dominating' VMC result. Completing an overall cycle of the IFM process, the arbiter is finally executing the IFM-re-vitalization command with the highest "trust-level".

Following the general idea of IFM, applying distributed intelligence—individually and independently performing the fault management and corresponding calculations—the implementation for the hardware sub-system solution for the IFM-arbiter is utilizing individual elementary processing paths judging each VMC reconfiguration command.

The IFM-arbiter is applying a specific working method, generating a 'non-consulted' decision. The VMC reconfiguration command with the highest 'trust-level' will overrule the multiple VMC reconfiguration commands. The result chosen—an important fact to mention—is representing the result of a single VMC, not a consolidated compromise, in which case there will be the problem that a VMC is involved that itself is defective.

This 'pseudo-cooperating VMC mode' has the advantage of not relying on the ability to come to an agreement among the individual sub-elements. Rather than being able to execute a solution in any condition, independent of the vitality status of the VMCs and corresponding control elements, the IFM principle thus is able to provide a fall-back strategy and system re-initialization solution—even in situations characterized by providing only a very limited rest of functionality.

The IFM principle is applied in a relentless manner—even including the final decision taking operation. The final decision is created in an non-democratic approach—ensuring capacity to act in situations representing 'worst case' level of remaining rest-functionality of the overall system.

In completing the IFM procedure, the arbiter will execute the IFM-command by generating an ECU system specific sequence, reorganizing the overall system to the calculated sub-vital system functionality, and in the last instance, issuing the system re-initialization command signals.

To sum up, the VMC process is organized in three major process states (cf. FIG. 5):

(1) Vital-state—and when operating in 'degraded functionality': the (1') sub-Vital-state(n). The subsequent state is (2).

(2) Uncertain-state.—The subsequent states are either (1) or (3)

(3) execution-state.—The subsequent state is (1')

During system V-state, the process (a) is executed. Routine (a) is continuously monitoring and testing the vitality of the specific control-element. Initiated by 'irregularities' and/or in predefined time intervals, the VMC will transit to U-state 2. The routine (b), performed during this state, is analyzing the system situation of the moment. Routine (b) will decide on either continuing in normal operation, causing a transit to V-state, or in case of identifying a severe fault, will initiate a transition to X-state 3.

In X-state, the VMC is performing the routines (c) and (d). The routines (c) and (d) are used to identify the failing elements and are calculating the IFM fallback strategy. Finally resulting in a solution for redefining and re-initiating the ECU system, process (d) is executed, restarting the refined ECU system.

Operating in the redefined system organization—identified as sub-Vital-state(n) 1', the VMC system is performing the routine (a') and the routine (e). The algorithms exercised by routine (a') are identical to the ones used by (a), however, (a') is applying revised vitality monitor reference tables.

The revised vitality monitor reference tables are interpreting the specific sub-V-state(n)—representing the ECU system operating in reduced 'fall-back' application.

During this specific 'degraded' system state 1', routine (e) is being performed in addition to the basic process (a'). This additional procedure is used to verify the persistency of the initial fault situation, the primary cause for entering the V(n)-state. If the (a') process can not be verify the persistence of the prior fault situation, the original system 'V-state' can be reinstalled.

The VMC process routines are:

(a, a') System Vitality Monitor

System diagnosis and fault detection algorithm applying a 2-phased system vitality investigation method:

Phase I: This phase is performing internal tests and diagnostics related to a specific CE. Each CE (VCM (n)) is continuously monitored and tested by diagnostics performed by a special routine, this routine being specific to each CE and taking leverage of standard tests and fault indicators like parity-check, checksums, etc.

Phase II: Get VMC (n) test reports and update internal VMC vitality signature.

Fault persistence assurance—verify specific CE vitality/fault persistence within validated asynchronous time window.

Identifying 'non-effective fault'—continue (uninterrupted) normal operation
  a) Identify 'minor' discrepancy or non-effective fault;
  b) Continue/Resume normal system operation;
  c) Indicate Vital System status (Vitality Status Register)

(e) Fault Persistency Verification

Monitor reconfigured system and reevaluate persistency of initial fault situation. This procedure will only be executed when the ECU is operating in 'degraded' state. The intent is to redefine the system to highest possible functionality—in case, the fault was temporary (or long term intermittent).

(b, c) Fault Identification, Recovery Strategy Calculation and System Redefinition Investigation of system state by a cooperative method involving all relevant system elements. Calculate extend of damage in accordance to the Phase I and Phase II reference tables using a unique 'situation trust level' method ('pseudo cooperative VMC mode').

Identify the failing CE (and/or sub-system components).—Stop ECU System in case of 'severe fault'.

System Redefinition: Redefine the 'system-assembly' according to the calculated fault recovery strategy. At this step, the system functionality is redefined appropriate to the present element availability. The fallback strategy is structured, following specific rules supporting a 'graceful degradation of system functionality'. It is an essential idea of the IFM method, not to simply give up the failing elements—but rather reusing the existing elements in applications differing from the original element assignment.
  a) Update/select P-I and P-II reference tables according to present system vitality
  b) Update Vitality Look-Up tables to present situation: indicate vital system (d) System Revitalization Initialize reconfigured system and, in certain cases, reboot the 'degraded system'

Restart appropriate applications reboot reusing systems for different applications
  a) Reuse 'major processing systems' application priority oriented
  b) Reuse storage sub-systems ('reverse boot' technique using 'top-down/bottom-up boot')

Validate system status indication. Indicate momentary system functionality state and going along capability.

Not restricted to a singular ECU-system internal implementation, the IFM principle can be extended to cover complex networked systems—applicable for all overall systems, featuring loosely coupled multi-processor architecture.

Figure 7:
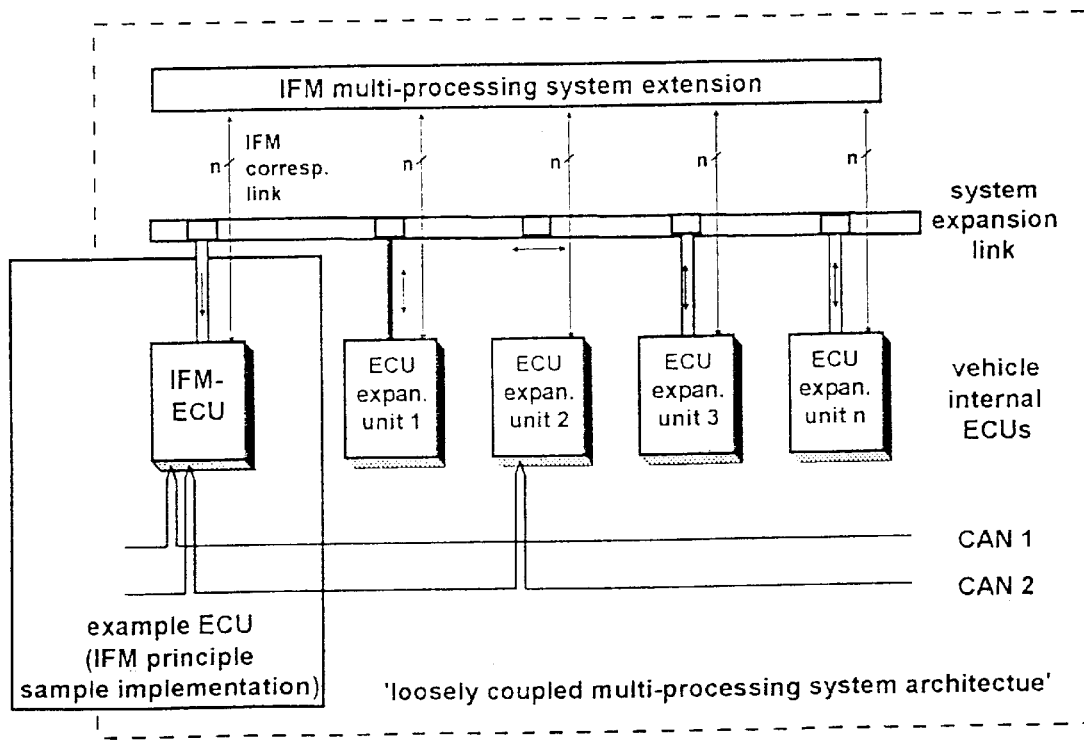

The extended application of the IFM-principle is demonstrated for an automotive system example illustrated by FIG. 7.

As described above, the precondition supporting profitable applicability of the IFM principle is a IFM-ECU-system internal architecture using loosely coupled control-elements and sub-processors.

Due to this fact it is obvious to extend the IFM application enclosing all important ECUs cooperating with the IFM-ECU initially in focus. As demanded for the IFM-ECU internal topology, a loosely coupled architecture for the overall system is building the precondition to allow an advantageous IFM extension covering the overall system.

The topology for the extended IFM principle is depending on the complexity of the overall multi-ECU system. Two solutions may be meaningful:
  (1) A flat topology, extending the VMCs and the IFM arbiter: In analogy to the prior described IFM realization, the IFM-ECU internal VMC processes will be supplemented by additional VMC processes covering the ECUs to be included into the extended IFM overall system. In this case, each ECU may be represented by a singular VMC or, as described for the IFM-ECU, by multiple VMCs.
  (2) A Hierarchic IFM topology: Principally following the IFM ground-rules, the hierarchic implementation is preferably used for highly complex systems. In this case, the inter-ECU correspondence of the VMCs is limited to a maintainable extend. Each ECU will perform a 'pre-arbitration' internally. The pre-arbitration results are reported to a master-arbiter, finally deciding on the IFM-revitalization command to be executed.

The key advantages of the method according to the present invention can be summarized as follows:

The IFM principle is combining an advantageous balance of hardware and software elements allowing to develop and to realize highly reliable embedded processing systems.

Furthermore, the principle delivers an optimal base structure supporting to build up fault tolerant system behavior at minimum hardware overhead.

The proposed principle is providing a fault fall-back behavior allowing to provide a hierarchical top down approach redefining the system functionality taking into account degradation of functionality.

Standard fault tolerant system techniques may be implemented in coincidence with the proposed IFM principle leading to an optimized system of specified requirements.

IFM is profitable put in action for processing platforms requiring to perform real-time applications in coincidence with non-real-time applications.

Instead of systems only utilizing reconfiguration of redundant elements and standard fault preventive measures the proposed system is reusing the existing singular instants of elements in multiple, fault depending application exchange.

To sum up, the principle according to the invention provides for
High system reliability and availability
Prioritized 'graceful degradation of system functionality' following a top-down approach.
Deterministic behavior of system in fault conditions—guaranteeing a minimum of specified base level functions (emergency fall back)
cost advantage due to minimized number of elements of redundant hardware components
cost advantage due to reduced fault preventive efforts
reduced physical measures (size and weight)
minimized power consumption

What is claimed is:

1. Electronic control system for controlling the function of a processing system, especially in an automotive vehicle, said electronic control system comprising a plurality of main logical control elements, each of which is especially adapted to perform special tasks, and each of said control elements being able to communicate to each other control element, characterized in that each of said logical control elements comprises additional control means for continuously monitoring the system and performing tests and diagnostics to detect system faults and severity of system faults, whereby said additional control means are interconnected by busses, thus allowing each of said control means to communicate with all other control means, wherein if the severity of a fault exceeds a predefined value, said additional control means identify failing element(s) by determining bit values representing the status of each individual control element, degrade functionality of said processing system in pre-assigned levels depending on the bit values determined, and re-initialize and re-vitalize said processing system in the degraded state.

2. Electronic control system according to claim 1, wherein said processing system is a loosely coupled system.

3. Electronic control system according to claim 1, wherein said logical control elements additionally comprise an individual timing functionality.

4. Electronic control system according to claim 1, wherein said additional control means are represented by hardware and/or software.

5. Electronic control system according to claim 1, additionally comprising arbitration means for judging said tests and diagnostics performed by each of said control means.

6. Electronic control system according to claim 2, wherein said logical control elements additionally comprise an individual timing functionality.

7. Electronic control system according to claim 2, wherein said additional control means are represented by hardware and/or software.

8. Electronic control system according to claim 3, wherein said additional control means are represented by hardware and/or software.

9. Electronic control system according to claim 2, additionally comprising arbitration means for judging said tests and diagnostics performed by each of said control means.

10. Electronic control system according to claim 3, additionally comprising arbitration means for judging said tests and diagnostics performed by each of said control means.

11. Electronic control system according to claim 4, additionally comprising arbitration means for judging said tests and diagnostics performed by each of said control means.

12. Electronic control system for controlling the function of a processing system, especially in an automotive vehicle, said electronic control system comprising a plurality of main logical control elements, each of which is especially adapted to perform special tasks, and each of said control elements being able to communicate to each other control element, characterized in that each of said logical control elements comprises additional control means for continuously monitoring the system and performing tests and diagnostics to detect system faults, wherein said additional control means are represented by hardware and/or software and wherein said additional control means are selected from the group comprising a state machine, a processor and a programmable sequencer, whereby said additional control means are interconnected by busses, thus allowing each of said control means to communicate with all other control means.

13. Method for managing system fault situations of an electronic control system, comprising the following steps:
a) providing a plurality of main logical control elements, each of said elements being adapted to perform special tasks,
b) providing additional control means to each of said control elements, said control means being interconnected by busses, thus allowing each of said control means to communicate with all other control means,
c) continuously monitoring said system and performing tests and diagnostics by each of said control means individually,
d) in case a failure and/or deviation from a predefined operation of said system is detected, analysing the system's present state and evaluating the severity of said failure and/or deviation by each of said control means individually,
e1) in case the severity of the failure and/or deviation does not exceed a predefined value, resuming normal operation of said system,
e2) in case the severity of the failure and/or deviation exceeds a predefined value, identifying the failing element(s) by determining bit values, representing the status of each individual control element,
f) degrading the system functionality in pre-assigned levels depending on the bit values determined; and
g) re-initializing and re-vitalizing said system in said degraded state.

14. Method according to claim 13, wherein said control means are carrying out individual programs adapted to respective control elements.

15. Method according to claim 13, wherein said control means are operating simultaneously and concurrently.

16. Method according to claim 13, wherein said control means are exchanging status information of the system.

17. Method according to claim 13, wherein said control means are exchanging calculated signatures, each of said control means providing individual results for re-vitalizing said system.

18. Method according to claim 17, wherein said control means each calculate a digital value representing a trust-level of said result.

19. Method according to claim 18, wherein an arbiter determines the highest digital value and subsequently executes a command in order to reorganize said system to the calculated degraded state.

20. Method according to claim 14, wherein said control means are exchanging calculated signatures, each of said control means providing individual results for re-vitalizing said system.

21. Method according to claim 15, wherein said control means are exchanging calculated signatures, each of said control means providing individual results for re-vitalizing said system.

22. Method according to claim 16, wherein said control means are exchanging calculated signatures, each of said control means providing individual results for revitalizing said system.

23. Electronic control system for controlling the function of a processing system, especially in an automotive vehicle, said electronic control system comprising a plurality of main logical control elements, each of which is especially adapted to perform special task, and each of said control elements being able to communicate to each other control element, characterized in that each of said logical control elements comprises additional control means for continuously monitoring the system and performing tests and diagnostics to detect system faults, wherein said additional control means are represented by hardware and/or software and wherein said additional control means are selected from the group comprising a state machine, a processor and a programmable sequencer, whereby said additional control means are interconnected by busses, thus allowing each of said control means to communicate with all other control means, said electronic control system further comprising arbitration means for judging said tests and diagnostics performed by each of said control means.

* * * * *